June 27, 1939.   G. W. HOOKER   2,163,877
PROCESS OF MAKING BROMINE
Filed July 1, 1937
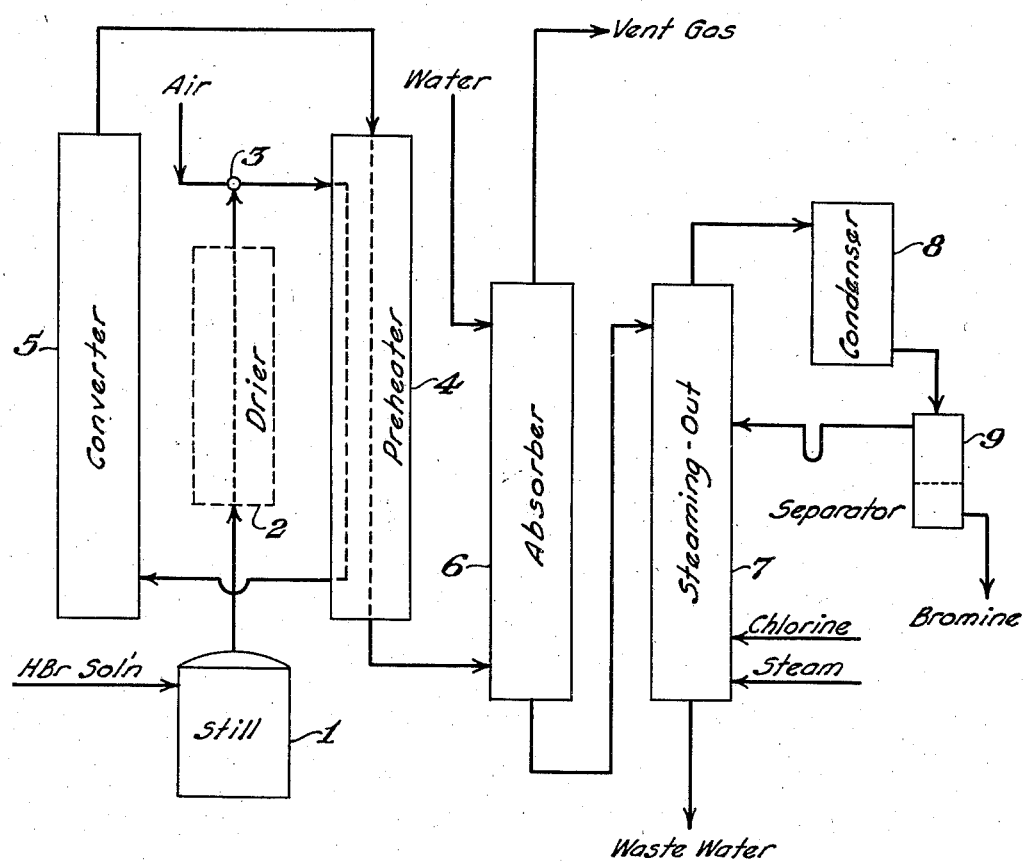
INVENTOR
George W. Hooker
BY
Griswold & Burdick
ATTORNEYS Patented June 27, 1939

2,163,877

UNITED STATES PATENT OFFICE 2,163,877

PROCESS OF MAKING BROMINE

George W. Hooker, Midland, Mich., assignor to The Dow Chemical Company, Midland, Mich., a corporation of Michigan Application July 1, 1937, Serial No. 151,464

2 Claims. (Cl. 23—216)

This invention relates to methods of making bromine, and in particular to methods which involve the oxidation of hydrogen bromide.

A well known process of making chlorine is the Deacon process, which consists in oxidizing hydrochloric acid gas with air, the reaction proceeding according to the equation:

(1) $$4HCl + O_2 \rightleftarrows 2Cl_2 + 2H_2O$$

The reaction is reversible, proceeding predominantly in the direction from left to right at temperatures below about 600° C., and in the reverse direction at higher temperatures. The reaction velocity at temperatures at which chlorine is formed in good yield is very low, and the reaction is only made commercially feasible by the use of a catalyst, cupric chloride being the best known catalyst. The optimum conditions for carrying out the process are found at temperatures of about 450° to 460° C. In practice the average yield of chlorine is about 65 per cent, so that, since 2 volumes of hydrogen chloride are chemically equivalent to one volume of chlorine, the reaction gases contain about equal volumes of the two gases. It is necessary to separate the hydrogen chloride from the chlorine by washing with water, such recovered hydrogen chloride being returned to the process. The catalyst bed is prepared by saturating a body of broken bricks, clay tiles or other ceramic material with a solution of cupric chloride and drying to remove the water. At the reaction temperature the catalyst is slowly vaporized, so that the loss must be made good from time to time by additions of more catalyst. To avoid poisoning or otherwise reducing the activity of the catalyst, it is necessary to purify and dry the hydrogen chloride, otherwise the yield diminishes rapidly to the point that continued operation becomes uneconomical. Using hydrogen chloride from the ordinarily available sources, under good operating conditions only a weak chlorine gas can be produced, which, after separating from hydrogen chloride, contains not more than about 8 to 12 per cent of chlorine by volume. The gas is too weak to be liquefied economically, and is suitable only for uses where a weak gas can be employed, as in making bleaching powder.

On account of the aforementioned limitations of the Deacon process, it has steadily lost ground as a commercially important source of chlorine for the industries, and has largely been superseded by electrolytic processes.

I have now found, however, that the similar reaction for the preparation of bromine by oxidizing hydrogen bromide with air or oxygen according to the equation:

(2) $$4HBr + O_2 \rightarrow 2Br_2 + 2H_2O$$

is not subject to the limitations and disabilities of the Deacon process. In fact under proper conditions it is easily possible to obtain from 95 to practically 100 per cent yield of bromine in much higher concentration than the chlorine produced by the Deacon process, so that it can be readily liquefied, if desired.

In organic bromination reactions, as is well known, an amount of hydrogen bromide is produced equivalent to the bromine combined with the organic compound, which hydrogen bromide for reasons of economy usually must be recovered and reconverted to bromine. The present process affords a most direct and simple method of reconverting such hydrogen bromide to bromine in connection with the commercial production of brominated organic compounds.

It is among the objects of the invention to provide a process by which the oxidation of hydrogen bromide by air or oxygen can be carried out to give a high or substantially quantitative yield of bromine. The invention, then, consists in the method or process fully described in the accompanying drawing and specification, and particularly pointed out in the claims.

In said drawing:

The single figure is a diagrammatic representation of an arrangement of apparatus suitable for carrying out the method of the invention.

In practicing the invention hydrogen bromide gas and air, either in the presence or absence of water vapor, are mixed and the mixture is passed in contact with a suitable catalyst at a temperature in the range of about 300° to about 700° C. A substantially quantitative conversion of hydrogen bromide to bromine can be attained at temperatures of 350° to 400° C., so that, although higher temperatures may ge used, there is ordinarily no advantage in doing so. It is preferable to dry the gases prior to the reaction, although not necessary in order to get a high yield of bromine. For example, the mixed gases and vapors obtained by vaporizing a constant boiling aqueous hydrobromic acid solution, containing about 49 per cent of HBr, can be oxidized with air at about 400° C. to produce an approximately 95 per cent yield of bromine. When a dried hydrogen bromide gas is used, a substantially 100 per cent yield of bromine can be obtained at about 350° C. In either case the reaction velocity is such that a time of contact of from 5 to 10 seconds between the reacting gases and the catalyst suffices to complete the reaction.

Suitable catalysts are similar to those which can be used in the Deacon process. In particular, copper compounds, such as cupric oxide, cupric bromide or other copper salts, are catalysts for the reaction. In the preferred reaction temperature range of about 325° to 425° C. there is no loss of catalyst by vaporization, such as occurs at the temperatures required in the Deacon process. Apparently under reaction conditions the copper salts, when used as catalyst, are converted more or less completely to cupric oxide. Other catalysts for the reaction are the oxides or salts of the metals nickel, cobalt, manganese, thorium, cerium, or mixtures thereof. The catalyst compound is preferably distributed on a carrier medium, such as pumice, quartz, brick, tile or other ceramic material. The carrier is advantageously broken up into small pieces or granules, and the pieces saturated with a solution or suspension of the catalytic compound, after which they are baked to dry them.

A convenient source of hydrogen bromide for use in the reaction is the constant boiling aqueous hydrobromic acid solution containing about 49 per cent of HBr, although solutions of other strengths, or hydrogen bromide gas, can also be used. In some cases the gaseous hydrogen bromide evolved from organic bromination reactions can be used directly.

One procedure for carrying out the invention is illustrated diagrammatically in the drawing. An aqueous hydrobromic acid solution, having for example the composition of the constant boiling acid solution (49 per cent HBr), is introduced into still 1, where it is vaporized by boiling. Still 1 is provided with an acid-proof lining, and may be heated by steam coils of acid-resistant metal, e. g., tantalum, or by other suitable means. The aqueous acid vapors are passed, in the direction shown by the arrows, first through a drier 2, where water vapor is removed by contact with a drying agent, such as sulphuric acid, calcium chloride, etc., and thence to a mixing valve 3, where air is admixed with the acid in approximately, or slightly more than, the theoretical proportion required to supply sufficient oxygen to oxidize the hydrogen bromide to bromine, the mixture of air and acid then passing to a preheater 4. If desired, drier 2 may be omitted, as indicated by the dotted outline. In preheater 4 the incoming mixture of air and acid is passed in indirect heat exchange contact with the hot reaction gases, to preheat the incoming gases to a point approximating the reaction temperature. From preheater 4 the preheated gas mixture is led to a convertor 5, which is charged with a body of catalyst, e. g., pumice impregnated with a cupric salt. The gases in traversing the catalyst bed are caused to react in accordance with Equation (2) above, forming elemental bromine. The reaction is exothermic, so that the process, once started, maintains itself without addition of heat from an external source. From the convertor 5 the reaction gases are passed through preheater 4, where they give up part of their heat to raise the temperature of the incoming gases, and thence to an absorbing system to remove and recover the bromine from the non-condensable gases accompanying it.

In the system illustrated the bromine is removed by condensing and absorbing in water. The partially cooled reaction gases from preheater 4 are introduced into the base of an absorber 6, which is in the form of a vertical column, preferably filled with packing material, similar to a scrubber tower. Water is introduced at the top of absorber 6, which, being intimately contacted with the reaction gases, condenses and partially dissolves the bromine, together with any unreacted hydrogen bromide, while the permanent gases, nitrogen, oxygen, etc., are vented from the top of the absorber. The liquid mixture of water and bromine, which flows from the bottom of the absorber, is pumped to a steaming-out column 7 of usual type, where the bromine is vaporized by steam introduced directly, bromine-free water flowing to waste at the bottom of the column. To decompose and liberate bromine from the hydrogen bromide in the solution chlorine may also be added in the steaming-out column. The vapors of bromine and water from the column 7 are condensed in condenser 8 and flow to a separator 9, where they separate into two layers, a lower layer of liquid bromine and an upper water layer saturated with bromine. The liquid bromine is drawn off, while the water layer is returned to the steaming-out column 7.

To start the above described system in operation the interior of preheater 4 is first heated, e. g., by means of an oil or gas burner, until a suitable temperature is reached. The vaporization of hydrogen bromide from still 1 is then commenced, and, if necessary, additional heat may be supplied by preheating the air mixed with the hydrogen bromide, until the catalyst bed in convertor 5 has been heated to a suitable working temperature. Thereafter the heat of reaction will suffice to maintain the required process temperature. The length and volume of the catalyst bed in convertor 5 is proportioned to the volume of gas flow for which the apparatus is designed, so that the time of passage of the gases through the catalyst will be sufficient for substantially complete reaction, e. g., about 5 to 10 seconds. Process control is secured by regulating the rate of gas flow so as to maintain the temperature of the exit gases from convertor 5, preferably at a point between 325° and 425° C. Some variation from the figures given is permissible, actual conditions for the best yield of bromine depending more or less upon the concentration of hydrogen bromide, the presence or absence of water vapor, the identity of the catalyst, etc. Under proper control a conversion of hydrogen bromide to bromine of 95 to 100 per cent can be had, with a concentration of 30 to 35 per cent of bromine in the reaction gases, figured on a dry basis. From a gas mixture of such composition bromine can be economically removed and recovered as liquid, by absorbing with water and steaming out in the manner described.

As an example of the results obtainable in the practice of the invention, dry hydrogen bromide and air were mixed to form a gas mixture containing approximately 43 per cent of HBr and 57 per cent of air (i. e., 3½ per cent excess of air). The gases were preheated to about 350° C. and passed at about the same temperature through a catalyst bed consisting of pumice impregnated with cupric bromide, the time of contact of gas with catalyst being varied from 5 to 10 seconds. A substantially 100 per cent yield of bromine was obtained.

Similarly, the vapors of a constant boiling hydrobromic acid solution (49 per cent of HBr) were mixed with an excess of air, and passed over the same catalyst at a temperature of about 400° to 410° C., the time of contact being about 18 seconds.

The conversion of hydrogen bromide to bromine was 97 per cent.

The present invention possesses great superiority as compared with the practice of the Deacon process for chlorine, in that it can be operated at a materially lower temperature, at which no loss of catalyst by volatilization occurs; the process is operable with wet gas as well as with dry gas; the reaction gases contain from 30 to 35 per cent of bromine, which is about 3 times the concentration of chlorine obtainable from the Deacon process, enabling the bromine to be recovered therefrom directly as liquid; and substantially quantitative yields of bromine can be secured.

Oxygen can be substituted for air in the process, with the added advantage of producing directly a still higher concentration of bromine in the reaction gases. The use of such modified procedure on a commercial scale would depend largely upon the cost of oxygen, when and if obtainable at a low enough cost, so that savings in other respects would more than offset the higher cost of oxygen as compared with air.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:

1. The process of oxidizing hydrogen bromide to bromine which comprises mixing hydrogen bromide gas with an oxygen-containing gas in such proportion that the oxygen is present in the mixture in excess of the proportion required by the theoretical equation, $$4HBr + O_2 \rightarrow 2Br_2 + 2H_2O$$

passing the mixed gases at a temperature between 325° and 425° C. in contact with a body of a catalyst consisting of a compound of a metal selected from the group consisting of copper, nickel, cobalt, manganese, thorium, and cerium, scrubbing the hot reaction gases with water to condense and absorb the bromine therein, vaporizing bromine from the water by distilling with steam, condensing the vapors, and separating liquid bromine from the aqueous condensate.

2. The process according to claim 1, in which the catalyst is a cupric compound.

GEORGE W. HOOKER.